US012665237B2

(12) United States Patent
Muro et al.

(10) Patent No.: US 12,665,237 B2
(45) Date of Patent: Jun. 23, 2026

(54) BATTERY MODULE AND BATTERY SYSTEM

(71) Applicant: KABUSHIKI KAISHA TOSHIBA, Tokyo (JP)

(72) Inventors: Nagaaki Muro, Kawasaki (JP); Yoshimitsu Ito, Hino (JP); Noboru Koike, Tama (JP); Mitsuhiro Hoshino, Fuchu (JP); Hirofumi Yamamoto, Saitama (JP); Tadashi Kano, Hachioji (JP); Hidenori Miyamoto, Fuchu (JP); Kazuto Kuroda, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 895 days.

(21) Appl. No.: 17/814,050

(22) Filed: Jul. 21, 2022

(65) Prior Publication Data

US 2022/0359930 A1 Nov. 10, 2022

Related U.S. Application Data

(63) Continuation of application No. PCT/JP2020/010876, filed on Mar. 12, 2020.

(51) Int. Cl.
H01M 10/6556 (2014.01)
H01M 10/613 (2014.01)
(Continued)

(52) U.S. Cl.
CPC ..... H01M 10/6556 (2015.04); H01M 10/613 (2015.04); H01M 10/6554 (2015.04);
(Continued)

(58) Field of Classification Search
CPC ............. H01M 10/613; H01M 10/653; H01M 10/6554; H01M 10/6556; H01M 50/103; H01M 50/119; H01M 50/209
See application file for complete search history.

(56) References Cited

U.S. PATENT DOCUMENTS 11,056,735 B2     7/2021   Burgers et al.
2015/0044538 A1*  2/2015   Katayama ......... H01M 10/6554
                                                    429/120
(Continued)

FOREIGN PATENT DOCUMENTS

CN            110316005 A      10/2019
DE     10 2014 202 240 A1      8/2015
(Continued)

OTHER PUBLICATIONS

Extended European Search Report Issued Jul. 2, 2024 in European Application 20924890.5, 8 pages.
(Continued)

*Primary Examiner* — Brittany L Raymond
(74) *Attorney, Agent, or Firm* — Oblon, McClelland, Maier & Neustadt, L.L.P.

(57) ABSTRACT

According to one embodiment, a battery includes a battery group, a case, a metal plate, an insulator and an electrical connection path. The battery group includes a plurality of batteries, and each of the batteries includes an electrode group and a metal exterior container made in which the electrode group is housed. The metal plate is provided between the battery group and the base and forms a clearance between the metal plate and the base. The insulator has plasticity and an electrical insulating property, and is sandwiched between the battery group and the metal plate. The insulator electrically insulates between the exterior container of each of the batteries and the metal plate. The electrical connection path electrically connects the metal plate to the base.

11 Claims, 8 Drawing Sheets

(51) Int. Cl.
  H01M 10/6554 (2014.01)
  H01M 50/103 (2021.01)
  H01M 50/119 (2021.01)
  H01M 50/209 (2021.01)
(52) U.S. Cl.
  CPC ....... H01M 50/103 (2021.01); H01M 50/119 (2021.01); H01M 50/209 (2021.01); H01M 2220/20 (2013.01)

(56)               References Cited

U.S. PATENT DOCUMENTS

| | | | |
|---|---|---|---|
| 2015/0171492 | A1 | 6/2015 | Ramsayer et al. |
| 2019/0157729 | A1* | 5/2019 | Yamashita ......... H01M 10/625 |

FOREIGN PATENT DOCUMENTS

| | | | |
|---|---|---|---|
| GB | 2537431 | A | 10/2016 |
| JP | 2000-243435 | A | 9/2000 |
| JP | 2013-125617 | A | 6/2013 |
| JP | 2013-164975 | A | 8/2013 |
| JP | 2013-543239 | A | 11/2013 |
| JP | 2015-520924 | A | 7/2015 |
| JP | 2016-29624 | A | 3/2016 |
| JP | 2016-201186 | A | 12/2016 |
| JP | 2018-60595 | A | 4/2018 |
| WO | WO 2016/135786 | A1 | 9/2016 |
| WO | WO 2016/166659 | A1 | 10/2016 |

OTHER PUBLICATIONS

International Search Report issued Jun. 2, 2020 in PCT/JP2020/010876, filed on Mar. 12, 2020, 2 pages.
Combined Chinese Office Action and Search Report issued Jul. 18, 2024 in Chinese Patent Application 202080088575.7, 17 pages (with English machine translation).

* cited by examiner

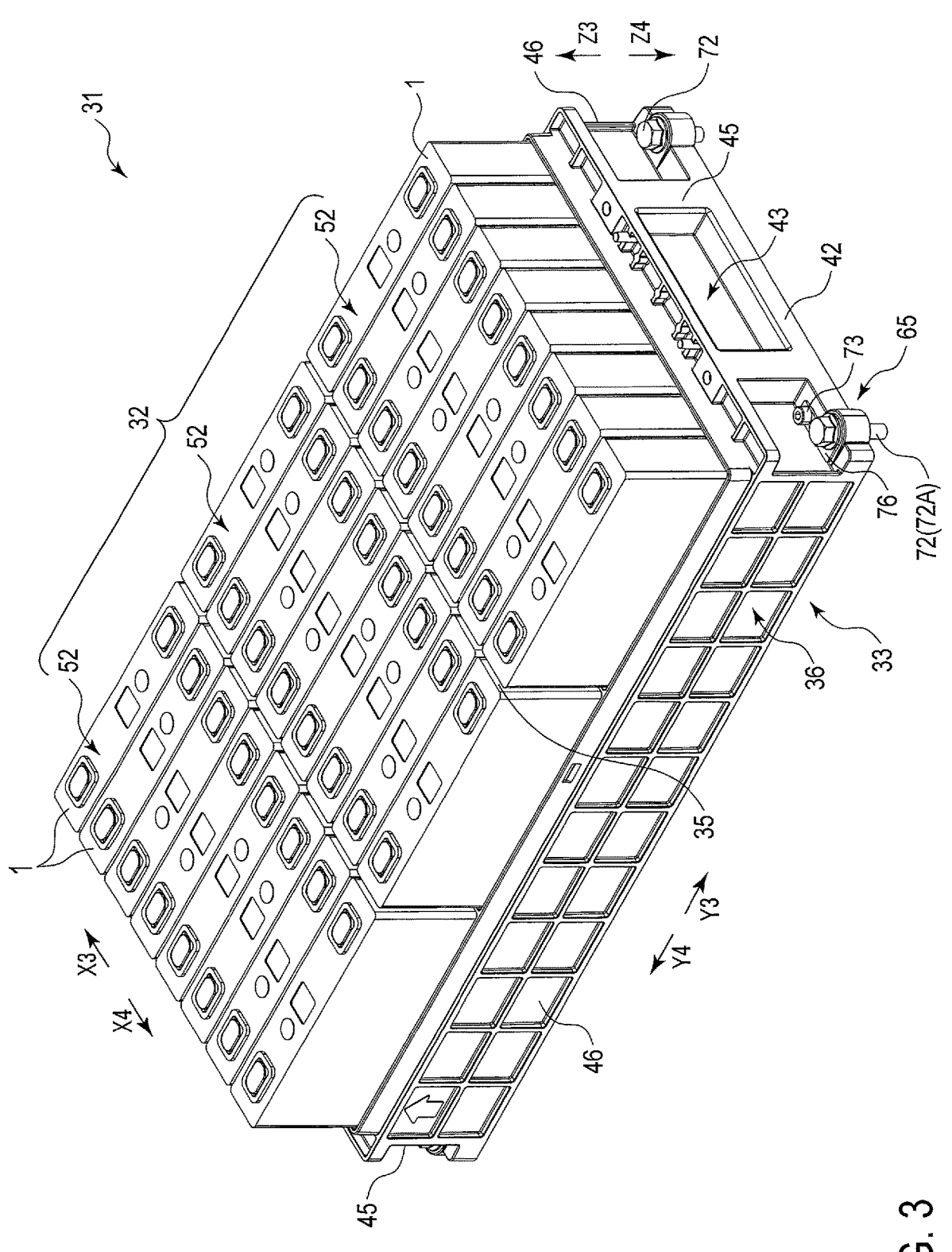
F I G. 3

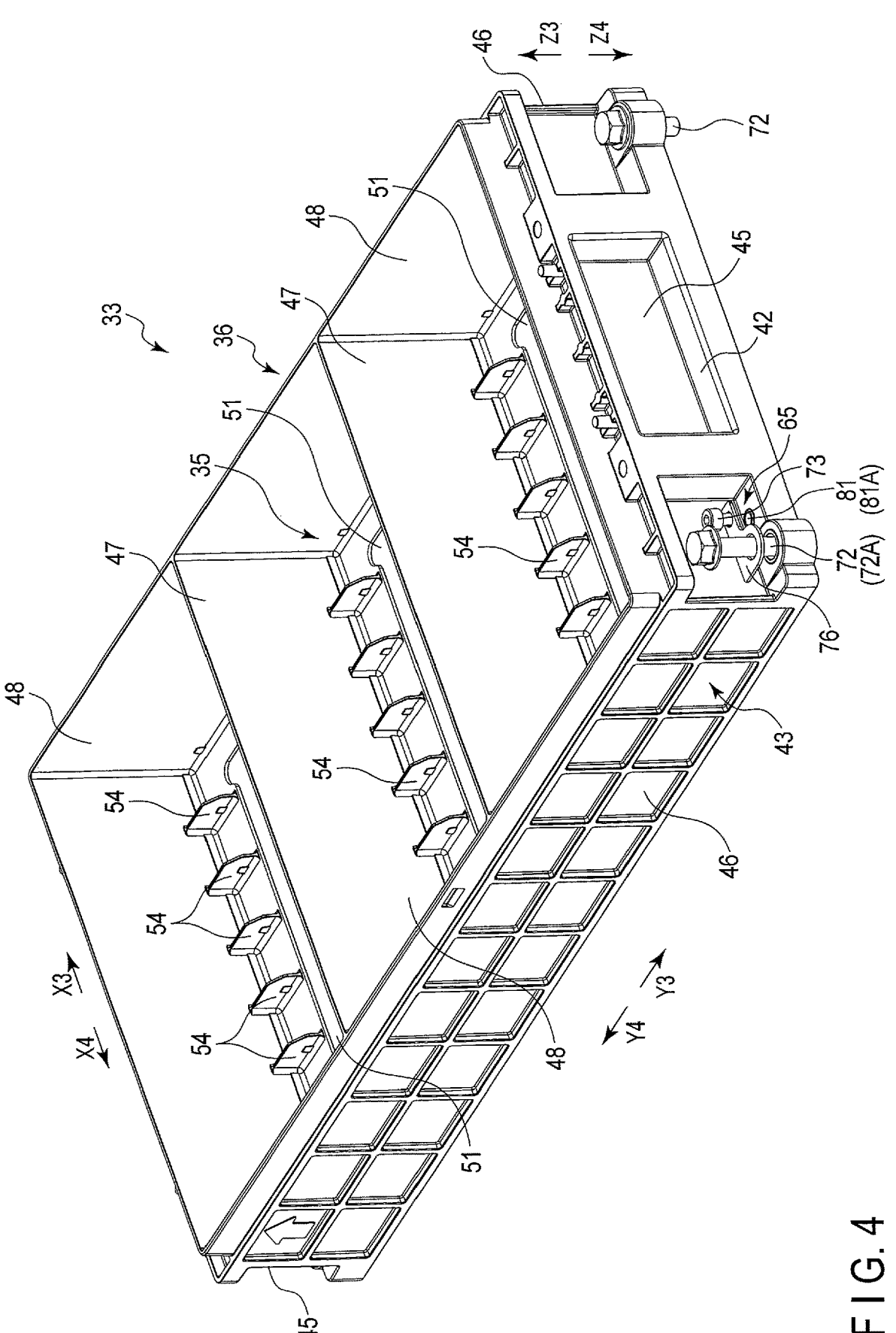
F I G. 4

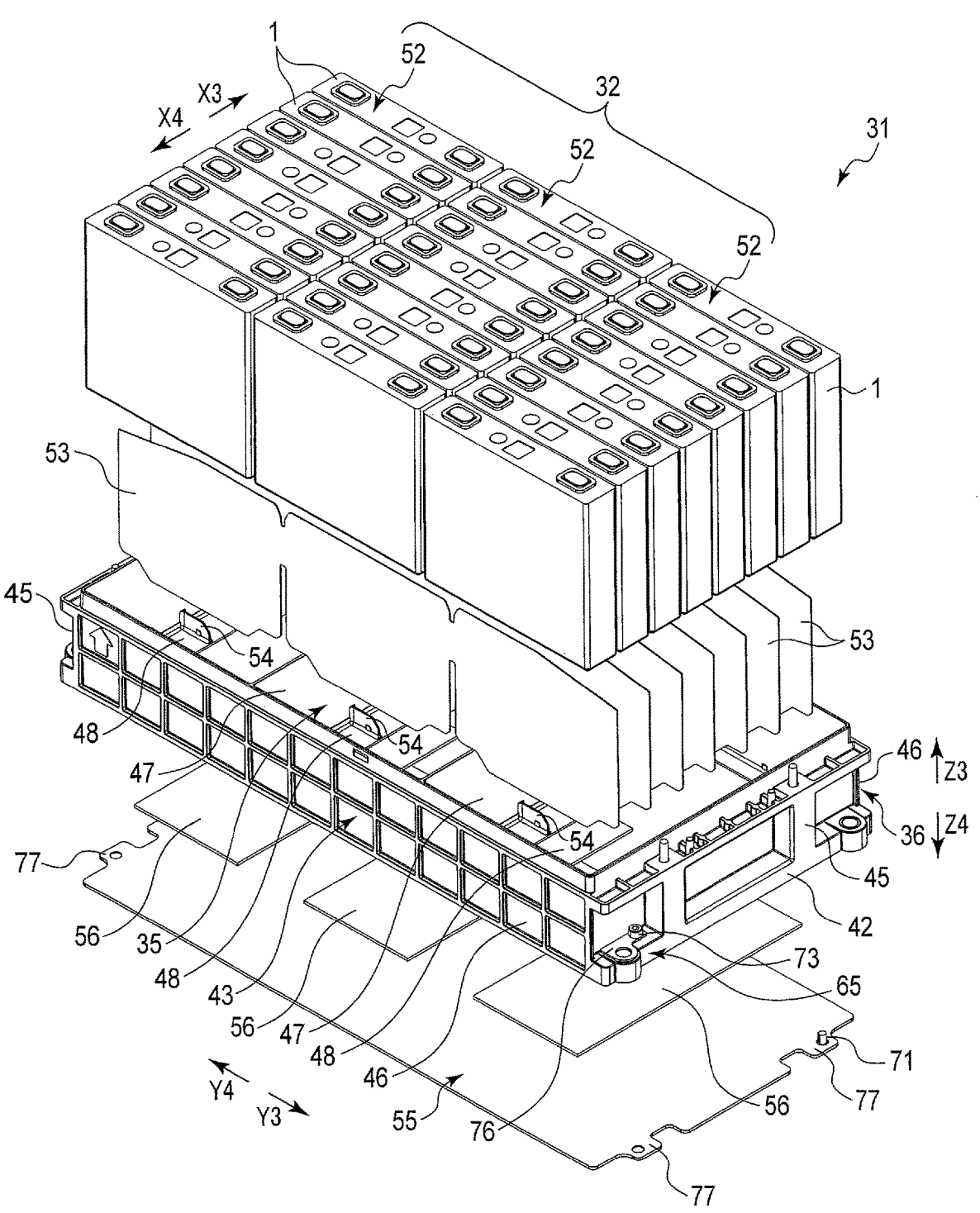
F I G. 5

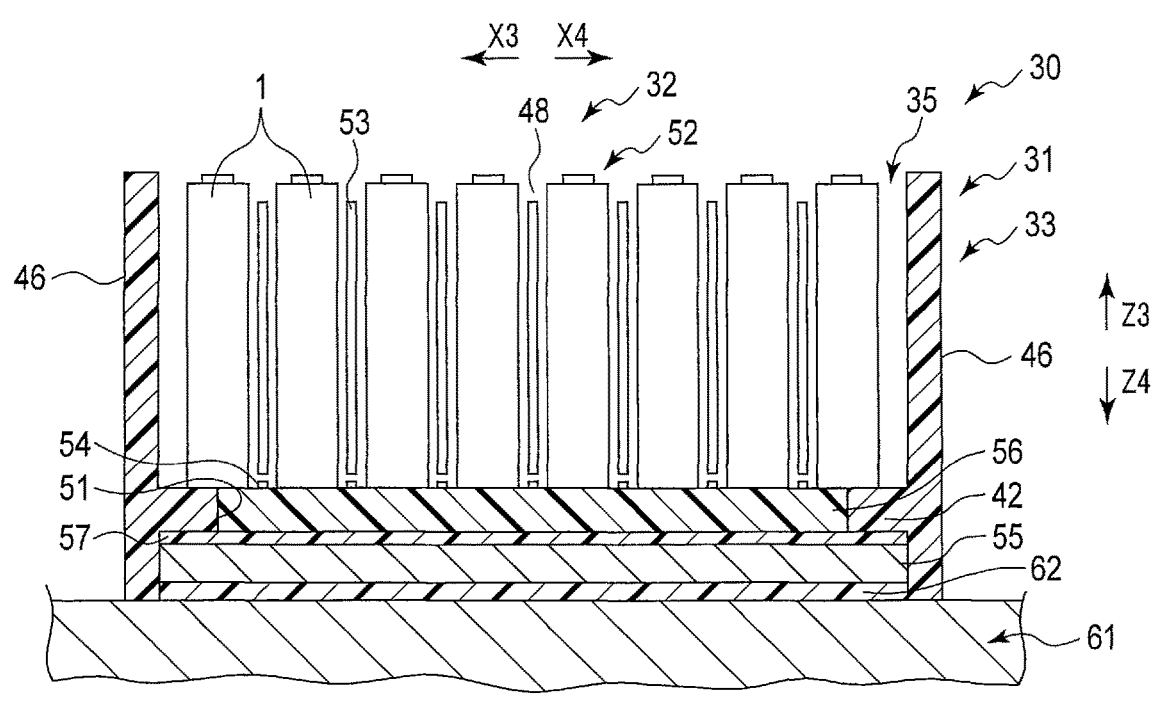
F I G. 6
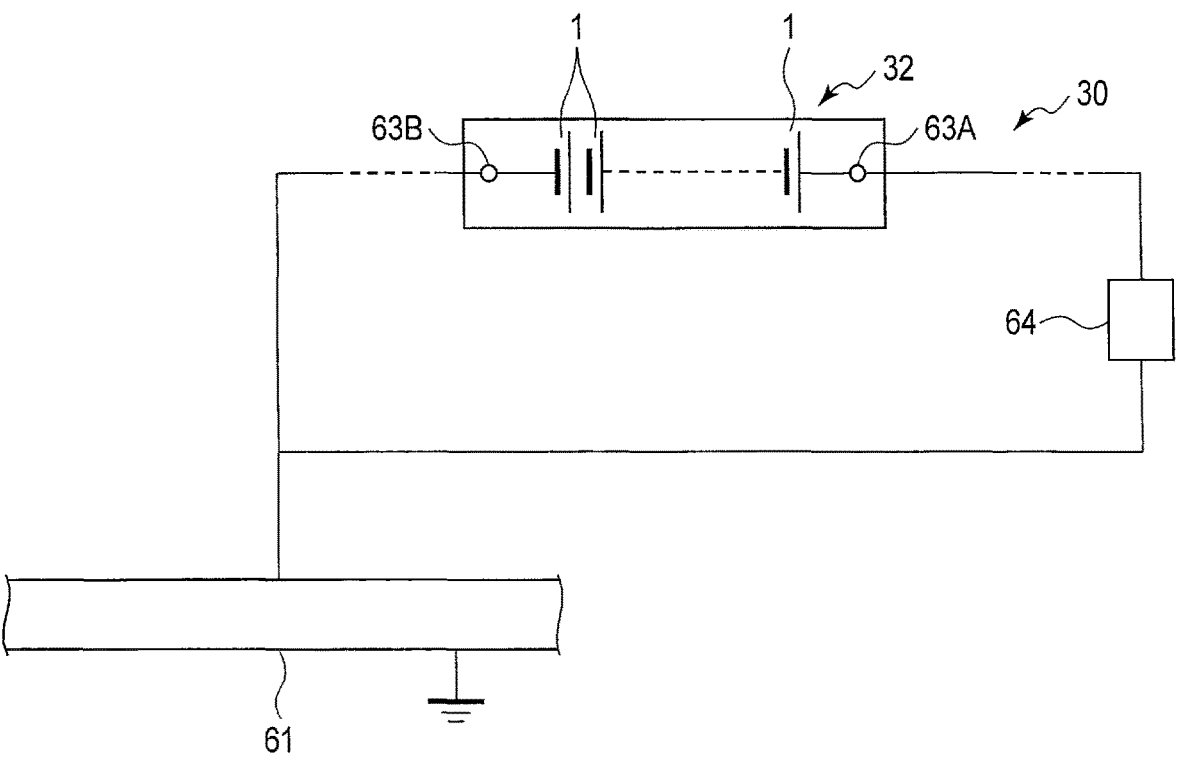
F I G. 7

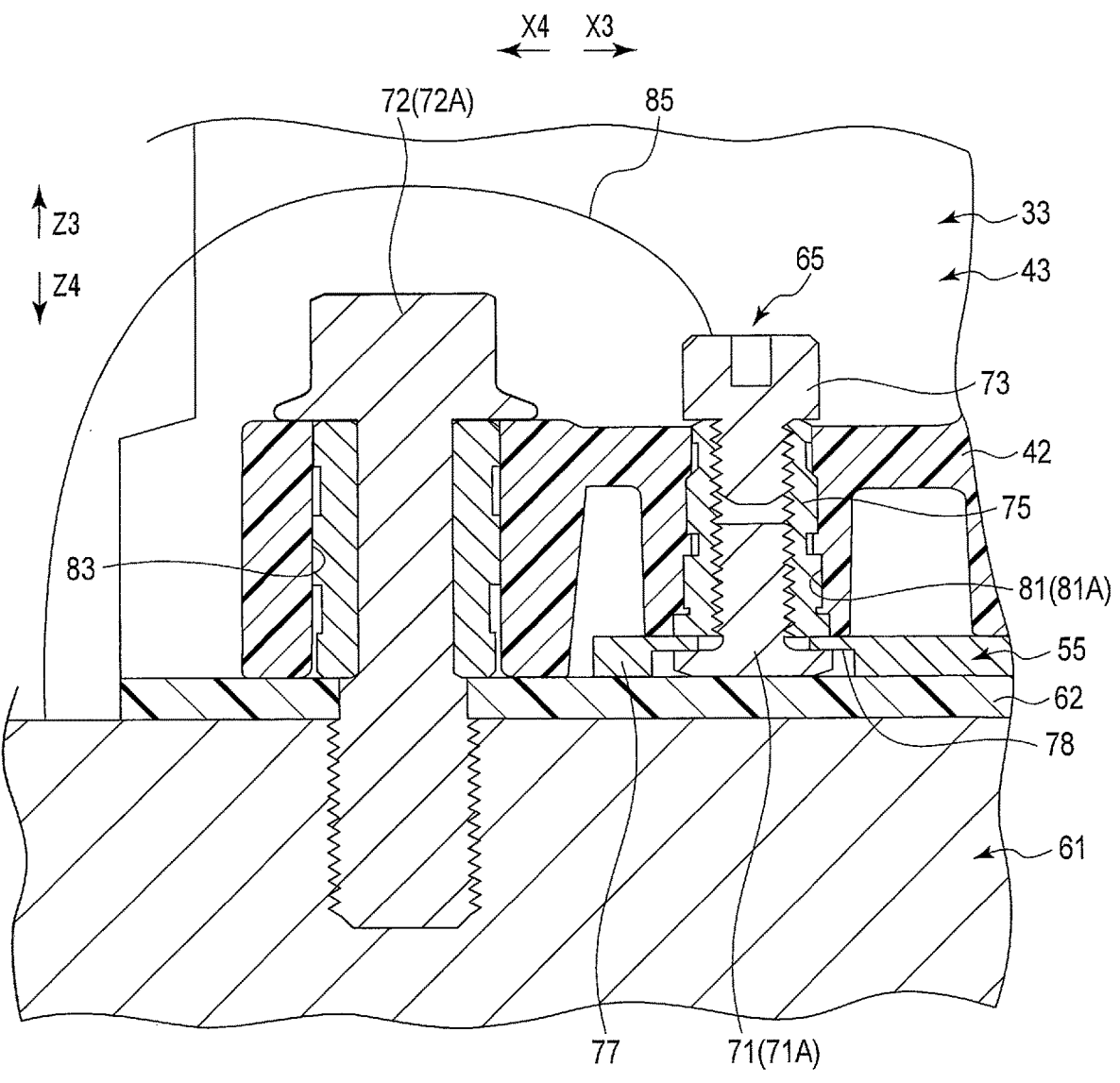
F I G. 9

BATTERY MODULE AND BATTERY SYSTEM

CROSS-REFERENCE TO RELATED APPLICATIONS

This is a Continuation Application of PCT Application No. PCT/JP2020/010876, filed Mar. 12, 2020, the entire contents of which are incorporated herein by reference.

FIELD

Embodiments described herein relate generally to a battery module and a battery system.

BACKGROUND

In a battery module, a battery group including a plurality of batteries (unit cells) is housed in a housing space of a case. In addition, as the battery module, from the viewpoint of improving transmission of heat generated in the battery group to the outside, there is a battery module in which a metal plate is provided and heat is dissipated from the metal plate. In such a battery module, a member having plasticity is brought into close contact with each of the battery group and the metal plate. Heat is transmitted from the battery group to the metal plate through the member having plasticity, and heat transmission from the battery group to the metal plate is improved. In addition, in such a battery module, an insulating material having an electrical insulating property is used as the member having plasticity. When the batteries of the battery group are charged or discharged, the battery group and the metal plate are electrically insulated from each other by the insulating material, etc.

As described above, in the battery module including the metal plate and the battery system including the battery module, it is required that charging in the metal plate is effectively prevented and discharging from the metal plate is effectively prevented.

BRIEF DESCRIPTION OF THE DRAWINGS

FIG. 3 is a perspective view showing the battery module of FIG. 2 in a state where a part of a case is omitted.

FIG. 4 is a perspective view showing a part of the case of the battery module of FIG. 2.

FIG. 5 is a perspective view showing the battery module of FIG. 2 in which the battery module is disassembled into components.

FIG. 6 is a cross-sectional view schematically showing the battery system according to the first embodiment.

FIG. 7 is a schematic diagram showing an example of a circuit configuration of the battery system according to the first embodiment.

FIG. 9 is a cross-sectional view schematically showing a configuration of an electrical connection path and the vicinity thereof in a battery system according to a modification.

DETAILED DESCRIPTION

According to one embodiment, a battery module installed on a base made of a metal is provided. The battery module includes a battery group, a case, a metal plate, an insulator and an electrical connection path. The battery group includes a plurality of batteries, and each of the batteries includes an electrode group and an exterior container made of a metal in which the electrode group is housed. The case includes a case peripheral wall which surrounds a housing space of the battery group and has an electrical insulating property. The metal plate is provided between the battery group and the base and forms a clearance between the metal plate and the base. The insulator has plasticity and an electrical insulating property, and is sandwiched between the battery group and the metal plate. The insulator electrically insulates between the exterior container of each of the batteries and the metal plate. The electrical connection path electrically connects the metal plate to the base.

Hereinafter, embodiments will be described with reference to the drawings.

A battery system according to an embodiment includes a base and a battery module installed on the base. In the battery module, a battery group including a plurality of batteries (unit cells) is mounted. The battery constituting the battery group is, for example, a secondary battery such as a lithium ion secondary battery.

[Battery]

Figure 1:
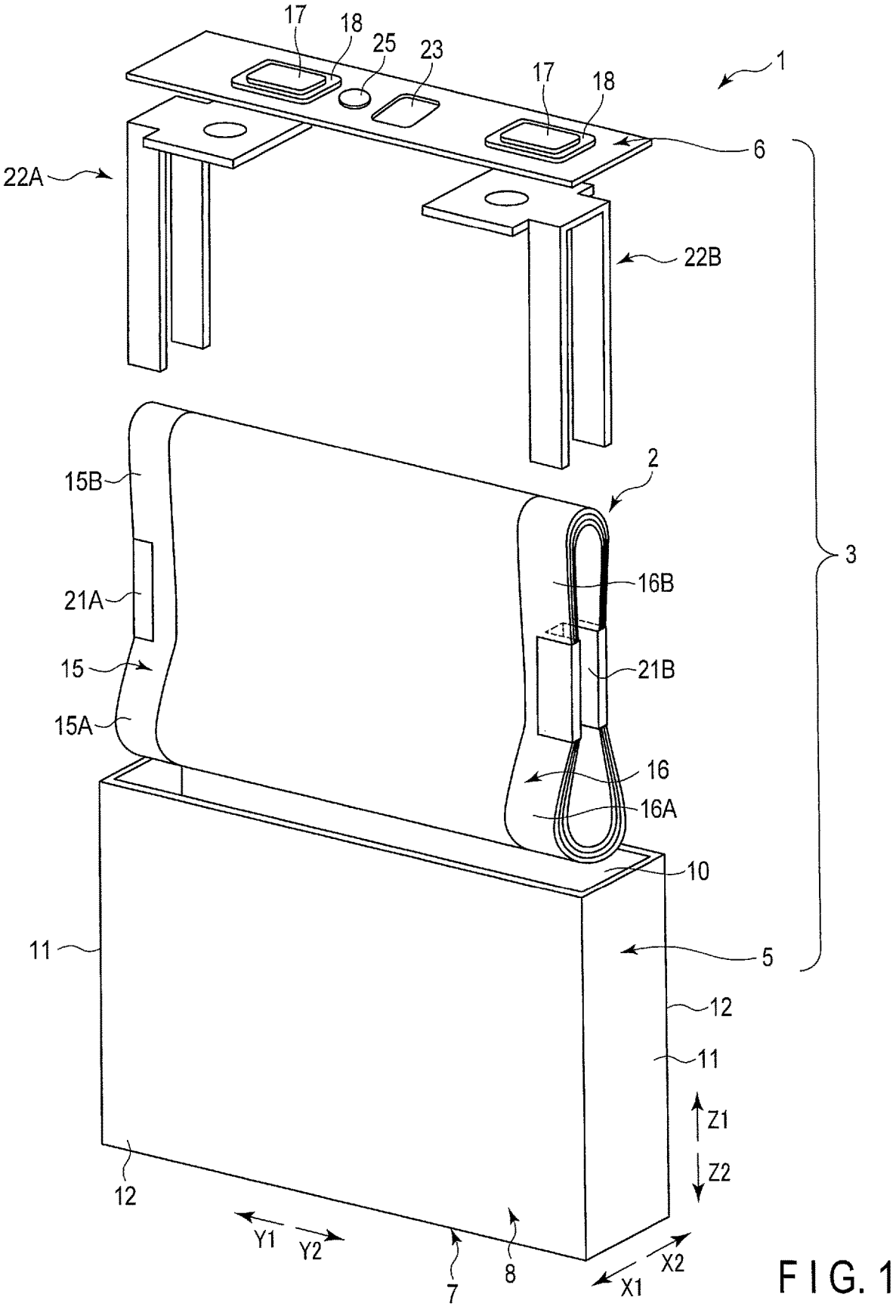
FIG. 1 is a perspective view schematically showing an example of a battery used in a battery module according to an embodiment.

First, a battery (unit cell) will be described. FIG. 1 shows an example of a battery 1. The battery 1 includes an electrode group 2 and an exterior container 3 in which the electrode group 2 is housed. The exterior container 3 is formed of a metal such as aluminum, an aluminum alloy, iron, or stainless steel. The exterior container 3 includes a container body 5 and a lid 6. Here, in the battery 1 and the exterior container 3, a depth direction (direction indicated by arrows X1 and X2), a lateral direction (direction indicated by arrows Y1 and Y2) intersecting (perpendicular or approximately perpendicular to) the depth direction, and a height direction (direction indicated by arrows Z1 and Z2) intersecting (perpendicular or approximately perpendicular to) both of the depth direction and the lateral direction are defined. In each of the battery 1 and the exterior container 3, the dimension in the depth direction is much smaller than each of the dimension in the lateral direction and the dimension in the height direction.

The container body 5 includes a bottom wall 7 and a peripheral wall 8. An inner cavity 10 in which the electrode group 2 is housed is defined by the bottom wall 7 and the peripheral wall 8. In the battery 1, the inner cavity 10 opens toward a side opposite to a side where the bottom wall 7 is located in the height direction. The peripheral wall 8 includes two pairs of side walls, side walls 11 and side walls 12. The pair of side walls 11 face each other with the inner cavity 10 interposed therebetween in the lateral direction. The pair of side walls 12 face each other with the inner cavity 10 interposed therebetween in the depth direction. Each of the side walls 11 extends continuously along the depth direction between the side walls 12. Each of the side walls 12 extends continuously along the lateral direction between the side walls 11. The lid 6 is attached to the container body 5 at an opening of the inner cavity 10. Accordingly, the lid 6 is attached to the peripheral wall 8 at an end opposite to the bottom wall 7. The lid 6 and bottom wall 7 face each other with the inner cavity 10 interposed therebetween in the height direction.

The electrode group 2 is formed in a flat shape, for example, and includes a positive electrode 15 and a negative electrode 16. In the electrode group 2, a separator (not shown) is interposed between the positive electrode 15 and the negative electrode 16. The separator is formed of an electrically insulating material, and electrically insulates the positive electrode 15 from the negative electrode 16.

The positive electrode 15 includes a positive electrode current collector 15A such as a positive electrode current collecting foil and a positive electrode active material-containing layer (not shown) supported on a surface of the positive electrode current collector 15A. The positive electrode current collector 15A is, but is not limited to, for example, an aluminum foil or an aluminum alloy foil, and has a thickness of about 10 μm to 20 μm. The positive electrode active material-containing layer includes a positive electrode active material, and may optionally contain a binder and an electro-conductive agent. Examples of the positive electrode active material include, but are not limited to, oxides, sulfides, and polymers, which can occlude and release lithium ions. The positive electrode current collector 15A includes a positive electrode current collecting tab 15B as a portion not supporting the positive electrode active material-containing layer.

The negative electrode 16 includes a negative electrode current collector 16A such as a negative electrode current collecting foil and a negative electrode active material-containing layer (not shown) supported on a surface of the negative electrode current collector 16A. The negative electrode current collector 16A is, but is not limited to, for example, an aluminum foil, an aluminum alloy foil, or a copper foil, and has a thickness of about 10 μm to 20 μm. The negative electrode active material-containing layer includes a negative electrode active material, and may optionally contain a binder and an electro-conductive agent. Examples of the negative electrode active material include, but are not particularly limited to, metal oxides, metal sulfides, metal nitrides, and carbon materials, which can occlude and release lithium ions. The negative electrode current collector 16A includes a negative electrode current collecting tab 16B as a portion not supporting the negative electrode active material-containing layer.

In the electrode group 2, the positive electrode current collecting tab 15B protrudes with respect to the negative electrode 16. The negative electrode current collecting tab 16B protrudes to a side opposite to the protruding direction of the positive electrode current collecting tab 15B with respect to the positive electrode 15. In the inner cavity 10 of the battery 1, the electrode group 2 is arranged in a state where the positive electrode current collecting tab 15B protrudes to one side in the lateral direction with respect to the negative electrode 16. In the electrode group 2, the negative electrode current collecting tab 16B protrudes to a side opposite to the side where the positive electrode current collecting tab 158 protrudes in the lateral direction of the battery 1 with respect to the positive electrode 15.

In the inner cavity 10, the electrode group 2 holds (is impregnated with) an electrolytic solution (not shown). The electrolytic solution may be a nonaqueous electrolytic solution in which an electrolyte is dissolved in an organic solvent, or an aqueous electrolytic solution such as an aqueous solution. Instead of the electrolytic solution, a gel electrolyte may be used, or a solid electrolyte may be used. When a solid electrolyte is used as an electrolyte, the solid electrolyte is interposed between the positive electrode 15 and the negative electrode 16 instead of the separator in the electrode group. In this case, the positive electrode 15 is electrically insulated from the negative electrode 16 by the solid electrolyte.

In the battery 1, a pair of electrode terminals 17 are attached to an outer surface (upper surface) of the lid 6 of the exterior container 3. The electrode terminal 17 is formed of an electro-conductive material such as a metal. One of the electrode terminals 17 is a positive electrode terminal of the battery 1 while the other is a negative electrode terminal of the battery 1. An insulating member 18 is provided between each of the electrode terminals 17 and the lid 6. Each of the electrode terminals 17 is electrically insulated from the exterior container 3 including the lid 6 by the insulating member 18.

The positive electrode current collecting tab 15B of the electrode group 2 is electrically connected to a positive electrode terminal, which is a corresponding one of the electrode terminals 17, via one or more positive electrode leads such as a backup lead 21A and a lead 22A. The negative electrode current collecting tab 16B of the electrode group 2 is electrically connected to a negative electrode terminal, which is a corresponding one of the electrode terminals 17, via one or more negative electrode leads such as a backup lead 21B and a lead 22B. Each of the positive electrode lead and the negative electrode lead is formed of an electro-conductive material such as a metal. In the inner cavity 10 of the exterior container 3, each of the positive electrode current collecting tab 15B and the positive electrode leads is electrically insulated from the exterior container 3 (the container body 5 and the lid 6) by one or more insulating members (not shown). In the inner cavity 10 of the exterior container 3, each of the negative electrode current collecting tab 16B and the negative electrode leads is electrically insulated from the exterior container 3 by one or more insulating members (not shown).

Further, in the example of FIG. 1, a gas release valve 23 and a liquid injection port are formed in the lid 6. A sealing plate 25 for closing the liquid injection port is welded to the outer surface of the lid 6. The gas release valve 23, the liquid injection port, etc. may not be provided in the battery. In addition, when the battery 1 is charged or discharged as described above, there is a possibility that the exterior container 3 may have an electric potential between an electric potential (positive electrode electric potential) of the positive electrode terminal (corresponding one of 17) and an electric potential (negative electrode electric potential) of the negative electrode terminal due to conduction through the electrolytic solution, etc.

[Battery Module and Battery System]

Hereinafter, a battery module and a battery system including the battery module will be described. The battery system includes a battery module and a base on which the battery module is installed. The battery module includes a battery group, and the battery group includes a plurality of batteries (unit cells). The plurality of batteries constituting the battery group have, for example, the same configuration as that of the battery 1 described above.

First Embodiment

Figure 2:
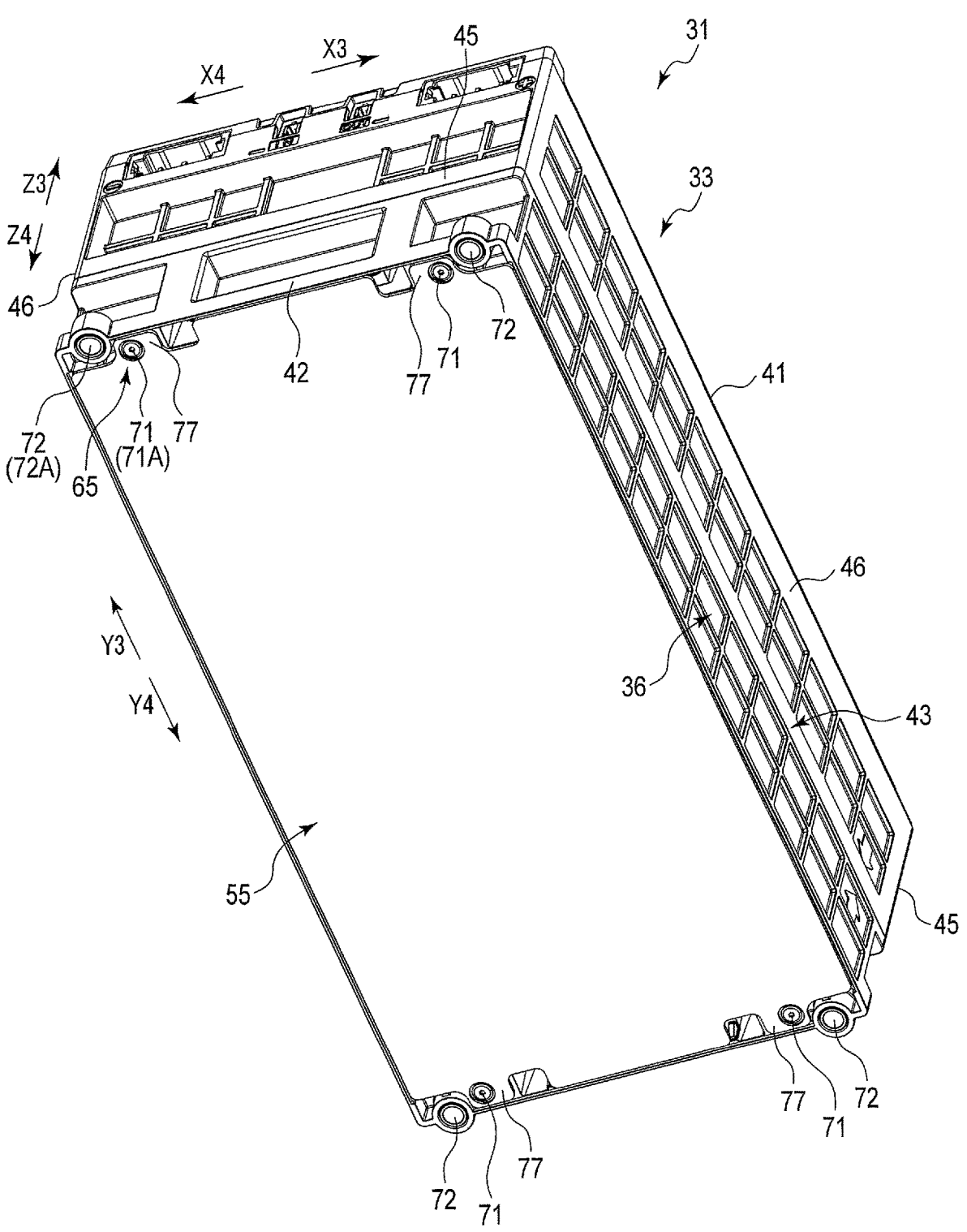
FIG. 2 is a perspective view showing a battery module provided in a battery system according to a first embodiment.

Hereinafter, a first embodiment of the battery system will be described. FIGS. 2 and 3 show a battery module 31 provided in the battery system of the present embodiment. As shown in FIGS. 2 and 3, etc., the battery module 31 includes a battery group 32 and a case 33 in which the battery group 32 is housed. A housing space 35 for the battery group 32 is defined by the case 33. The battery group 32 includes a plurality of batteries (unit cells) 1 described above, and in the battery group 32, the plurality of batteries 1 are electrically connected via a bus bar (not shown), etc. In the battery group 32, at least one of an in-series connection structure in which the plurality of batteries 1 are electrically connected in series and an in-parallel connection structure in which the plurality of batteries 1 are electrically connected in parallel is formed.

The case 33 is formed of an electrically insulating material. Examples of the material forming the case 33 include resins such as polyphenylene ether, polycarbonate, and polybutylene terephthalate. In the example of FIGS. 2 and 3, the case 33 is formed of a plurality of members including a case member 36. In FIG. 3, portions of the case 33 other than the case member 36 are omitted. Here, in the battery module 31 including the battery group 32 and the case 33, a depth direction (direction indicated by arrows X3 and X4), a lateral direction (direction indicated by arrows Y3 and Y4) intersecting (perpendicular or approximately perpendicular to) the depth direction, and a height direction (direction indicated by arrows Z3 and Z4) intersecting (perpendicular or approximately perpendicular to) both the depth direction and the lateral direction are defined.

FIG. 4 shows the case member 36 forming a part of the case 33. As shown in FIGS. 2 to 4, the case 33 includes a case top wall (case upper wall) 41, a case bottom wall 42, and a case peripheral wall 43. In the case 33, the case top wall 41 and the case bottom wall 42 face each other with the housing space 35 interposed therebetween in the height direction. The case peripheral wall 43 extends continuously along the height direction between the case top wall 41 and the case bottom wall 42. The case peripheral wall 43 surrounds the housing space 35 over the entire periphery in the circumferential direction of the battery module 31. The case peripheral wall 43 is provided with two pairs of case side walls, case side walls 45 and case side walls 46. The pair of case side walls 45 face each other with the housing space 35 interposed therebetween in the lateral direction. The pair of case side walls 46 face each other with the housing space 35 interposed therebetween in the depth direction. Each of the case side walls 45 extends continuously along the depth direction between the case side walls 46. Each of the case side walls 46 extends continuously along the lateral direction between the case side walls 45.

The case 33 includes two partition walls 47. The partition walls 47 are arranged between the pair of case side walls 45 in the lateral direction, and are arranged away from each other in the lateral direction. Further, each of the partition walls 47 is arranged away from each of the case side walls 45 in the lateral direction. Each of the partition walls 47 extends continuously along the height direction between the case top wall 41 and the case bottom wall 42. Each of the partition walls 47 extends continuously in the depth direction between the case side walls 46. Since the two partition walls 47 are formed as described above, in the example of FIGS. 2 to 4, the housing space 35 of the battery group 32 is partitioned into three regions 48 by the partition walls 47. That is, the housing space 35 is divided into three parts in the lateral direction by the partition walls 47.

The case bottom wall 42 supports the battery group 32 from one side of the height direction. Three through holes 51 are formed in the case bottom wall 42. In the case bottom wall 42, each of the through holes 51 is formed at a position corresponding to one of the regions 48. Each of the regions 48 of the housing space 35 is open to an outer portion of the case 33 through a corresponding one of the through holes 51. In each of two regions located at both ends in the lateral direction among the three regions 48, the case bottom wall 42 protrudes toward an inner peripheral side from each of the case side walls 45 and 46 and the partition wall 47, and an edge of the through hole 51 is formed by a protruding end of the case bottom wall 42. In one of the three regions 48 located at the center in the lateral direction, the case bottom wall 42 protrudes toward an inner peripheral side from each of the case side walls 46 and the partition walls 47, and an edge of the through hole 51 is formed by a protruding end of the case bottom wall 42. Accordingly, in each of the regions 48, the case bottom wall 42 is formed in a state of protruding toward the inner peripheral side over the entire periphery, and in each of the through holes 51, the edge is formed over the entire periphery by the protruding end of the case bottom wall 42.

FIG. 5 shows the battery module 31 disassembled into components. In FIG. 5, portions of the case 33 other than the case member 36 are omitted. As shown in FIGS. 3 and 5, in the present embodiment, the battery group 32 includes three battery rows 52. Each of the battery rows 52 is arranged in a corresponding one of the regions 48 in the housing space 35. The battery rows 52 adjacent to each other in the lateral direction of the battery module 31 are partitioned by the partition wall 47. In the battery row 52, a plurality of batteries 1 are arrayed, and in the example of FIG. 3, etc., eight batteries 1 are arrayed in each of the battery rows 52. In each of the battery rows 52, the batteries 1 are arrayed such that an array direction of the batteries 1 coincides or approximately coincides with the depth direction of the battery module 31 (case 33). In each of the three regions 48, the battery row 52 is supported by the protruding portion of the case bottom wall 42 toward the inner peripheral side.

In the battery group 32 (each of the battery rows 52), the depth direction of each of the batteries 1 coincides or approximately coincides with the depth direction of the battery module 31 (case 33), and the lateral direction of each of the batteries 1 coincides or approximately coincides with the lateral direction of the battery module 31. In the battery group 32, the height direction of each of the batteries 1 coincides or approximately coincides with the height direction of the battery module 31. Each of the batteries 1 is arranged in the housing space 35 in a state where the outer surface of the bottom wall 7 faces a side where the case bottom wall 42 is located and the outer surface of the lid 6 faces a side where the case top wall 41 is located. Further, in each of the battery rows 52, the plurality of batteries 1 are arrayed without shifting or almost without shifting with respect to one another in the lateral direction and the height direction of the battery module 31. In addition, the three battery rows 52 are arranged without shifting or almost without shifting with respect to one another in the depth direction and the height direction of the battery module 31.

In each battery row 52 of the battery group 32, a partition plate (separator) 53 is provided between the batteries 1 adjacent to each other in the array direction (depth direction of the battery module 31). One or more partition plates 53 are provided in each of the battery rows 52, and in the example of FIG. 3, etc., seven partition plates 53 are provided in each of the battery rows 52. At least an outer surface of each of the partition plates 53 is formed of an electrically insulating material. Examples of the material forming at least the outer surface of the partition plate 53 include electrically insulating resins such as polyphenylene ether (PPE), polycarbonate (PC), and polybutylene terephthalate (PET). In each of the regions 48, a segmentation plate 54 is formed by the case 33. Each of the regions 48 is partitioned by the segmentation plate 54 into the same number of segmentation ranges as the number of batteries 1 forming a corresponding one of the battery rows 52. In each of the battery rows 52, each of the batteries 1 is arranged in a corresponding one of the above-described segmentation ranges.

Further, the battery module 31 includes a metal plate (bottom plate) 55 on which the battery group 32 and the case 33 are installed. The metal plate (heat dissipation plate) 55 has a higher thermal conductivity than the case 33. Examples of the material forming the metal plate 55 include aluminum and an aluminum alloy. The metal plate 55 is attached to the case 33 from the side where the case bottom wall 42 is located in the height direction of the battery module 31. The metal plate 55 is formed in an appropriate size and shape as necessary, and in one example, is formed in a flat plate shape or an approximately flat plate shape which has a thickness of about 0.5 mm to 5 mm.

FIG. 6 schematically shows a battery system 30 including the above-described battery module 31. As shown in FIGS. 5 and 6, etc., the battery module 31 includes three insulating sheets (insulators) 56. Each of the insulating sheets 56 has plasticity and an electrical insulating property, and has a higher thermal conductivity than the case 33 and the air. An example of a material forming each of the insulating sheets 56 is a resin having plasticity and an electrical insulating property such as silicone. However, each of the insulating sheets 56 has a lower thermal conductivity than the metal plate 55. Each of the insulating sheets 56 is sandwiched between the battery group 32 and the metal plate 55 in the height direction of the battery module 31.

Each of the insulating sheets 56 is arranged in a corresponding one of the regions 48 in the housing space 35. Each of the insulating sheets 56 closely contacts and abuts a corresponding one of the battery rows 52 in a corresponding one of the regions 48. In each of the battery rows 52, a corresponding one of the insulating sheets 56 closely contacts and abuts the exterior container 3 (bottom wall 7) of each of the batteries 1 from the side where the metal plate 55 is located in the height direction of the battery module 31. In each of the battery rows 52, in each of the batteries 1, a part of the bottom wall 7 of the exterior container 3 abuts the case bottom wall 42 or is bonded to the case bottom wall 42 via an adhesive, etc. As a result, each of the battery rows 52 is supported by the protruding portion of the case bottom wall 42 toward the inner peripheral side. In each of the batteries 1 in each of the battery rows 52, a corresponding one of the insulating sheets 56 closely contacts and abuts a portion of the bottom wall 7 of the exterior container 3 other than the portions abutting and bonded to the case bottom wall 42. A portion of each of the insulating sheets 56 is arranged in a corresponding one of the through holes 51. A corresponding one of the insulating sheets 56 is inserted into each of the through holes 51, and each of the through holes 51 is substantially filled with the corresponding one of the insulating sheets 56. In manufacturing, however, a slight gap is formed between the insulating sheet 56 arranged in each of the through holes 51 and the protruding end of the case bottom wall 42.

In the battery module 31, an insulating film 57 is formed on a surface of the metal plate 55 facing a side where the battery group 32 is located. Therefore, the insulating film 57 is formed between the metal plate 55 and each of the insulating sheets 56 and the case bottom wall 42 in the height direction of the battery module 31. The insulating film 57 has an electrical insulating property. The insulating film 57 is, for example, an epoxy resin film, etc., and is formed of a resin having an electrical insulating property.

The case bottom wall 42 abuts the insulating film 57 of the metal plate 55 from the side where the battery group 32 is located in the height direction. In addition, each of the insulating sheets 56 closely contacts and abuts the insulating film 57 of the metal plate 55 from the side where the battery group 32 is located in the height direction of the battery module 31. Thus, a gap, etc. between each of the battery rows 52 of the battery group 32 and the metal plate 55 is filled with a corresponding one of the insulating sheets 56. The battery group 32 is electrically insulated from the metal plate 55 by the insulating sheets 56, the insulating film 57, etc. In each of the regions 48, the case bottom wall 42 protrudes toward the inner peripheral side with respect to the insulating film 57.

Since the battery module 31 is formed as described above, each of the insulating sheets 56 and the case bottom wall 42 is sandwiched between the battery group 32 and the metal plate 55 (including the insulating film 57) in the height direction of the battery module 31. In the battery module 31, heat generated in each of the battery rows 52 is transmitted to the metal plate 55 through a corresponding one of the insulating sheets 56 and the insulating film 57. Each of the insulating sheets 56 transmits heat transmitted from the battery group 32 to the metal plate 55. Therefore, a heat transmission path that does not pass through the air from the battery group 32 to the metal plate 55 is formed by the insulating sheets 56, etc.

As shown in FIG. 6, etc., the battery system 30 includes a metallic base (cooling plate) 61 on which the battery module 31 is installed. Accordingly, the battery group 32, the case 33, and the metal plate 55 are installed on the base 61. The base 61 has a higher thermal conductivity than that of the case 33 and the insulating sheets 56, and has, for example, a thermal conductivity similar to that of the metal plate 55. In the battery system 30, the battery module 31 is used as a stationary power source, a power source for a railroad vehicle, etc. Here, when the battery system 30 is used for a railroad, for example, a large number of batteries are connected in series, and thus a high cooling performance is required. For this reason, in the battery system 30, the base 61 is provided as a cooling plate in a portion in contact with the battery module 31, and, for example, a flow path through which a cooling fluid including a cooling liquid, a cooling gas, etc. flows is provided in an inner portion of the base 61 as the cooling plate to perform forced cooling.

The base 61 is arranged on the side opposite to the side where the battery group 32 is located with respect to the metal plate 55 in the height direction of the battery module 31. In addition, the base 61 is arranged away from the metal plate 55 on the side opposite to the side where the battery group 32 is located. That is, a clearance is formed between the metal plate 55 and the base 61 in the height direction of the battery module 31. In one example, the clearance between the metal plate 55 and the base 61 is about 0.2 mm.

In the battery system 30, an insulating layer 62 is formed in the clearance between the metal plate 55 and the base 61. The insulating layer 62 has plasticity and an electrical insulating property. The insulating layer 62 is, for example, formed of a resin having plasticity and an electrical insulating property, such as silicone grease. The clearance between the metal plate 55 and the base 61 is filled with the insulating layer 62. Thus, the insulating layer 62 is sandwiched between the metal plate 55 and the base 61 in the height direction of the battery module 31. The insulating layer 62 closely contacts and abuts each of the metal plate 55 and the base 61.

The insulating layer 62 has a higher thermal conductivity than that of the air and the case 33. However, the insulating layer 62 has a lower thermal conductivity than that of the metal plate 55 and the base 61. Since the battery system 30 is formed as described above, the heat generated in each of the battery rows 52 is transmitted to the base 61 through a corresponding one of the insulating sheets 56, the insulating film 57, the metal plate 55, and the insulating layer 62 in this order. That is, the insulating layer 62 transmits the heat transmitted from the metal plate 55 to the base 61. Accordingly, a heat transmission path that does not pass through the air from the battery group 32 to the base 61 is formed by the insulating sheets 56, the metal plate 55, the insulating layer 62, etc.

FIG. 7 shows an example of a circuit configuration of the battery system 30. As shown in FIG. 7, the battery group 32 includes a pair of external terminals 63A and 63B. The external terminal 63A is a positive electrode external terminal of the battery group 32 (the battery module 31), and the external terminal 63B is a negative electrode external terminal of the battery group 32. In the battery system 30, the battery group 32 is electrically connected to a power source and a load (indicated by reference sign 64 in FIG. 7). When power is supplied from the power source to the battery group 32, the battery group 32 (battery module 31) is charged. When power is supplied from the battery group 32 to the load, the battery group 32 (battery module 31) is discharged.

In the example of FIG. 7, the base 61 is grounded, and the base 61 becomes GND. A GND-side path of a current path of an electric current flowing through the battery group 32 is connected to the base 61. In the battery group 32, the external terminal (positive electrode external terminal) 63A is connected to the load, etc. (e.g., 64) without interposing a battery group, etc. of another battery module therebetween or with a battery group, etc. of another battery module interposed therebetween. In addition, in the battery group 32, the external terminal (negative electrode external terminal) 63B is connected to a ground-side path (base 61) without interposing a battery group, etc. of another battery module therebetween or with a battery group, etc. of another battery module interposed therebetween. When the external terminal 63B is connected to the ground-side path without interposing a battery group, etc. of another battery module therebetween, an electric potential (negative electrode electric potential) of the external terminal 63B of the battery group 32 coincides with an electric potential of the base 61 and becomes a GND electric potential. For example, in a case where the battery system 30 is used in a railroad vehicle, etc., the base 61 becomes GND as in the example of FIG. 7.

Here, in IEC62497-1, an insulation distance between two conductors is defined. The insulation distance of IEC62497-1 is defined by a creepage distance or spatial distance between two conductors spaced apart from each other. An allowable limit value of the insulation distance is set as a lower limit value of a range in which discharging does not occur between the two conductors when a voltage (electric potential difference) occurs between the two conductors. The allowable limit value of the insulation distance varies depending on the voltage between the two conductors. For example, in the definition of IEC62497-1, when a creepage distance between two conductors is 12 mm and a spatial distance is 6.7 mm, a rated impulse withstanding voltage between the two conductors is 6 kV. That is, when the rated impulse voltage between two conductors is 6 kV, the allowable limit value of the insulation distance is 12 mm in the creepage distance and 6.7 mm in the spatial distance.

In the battery system 30, during charging and discharging of the battery group 32, the exterior container 3 of each of the batteries 1 may have an electric potential different from that of the GND (base 61) due to conduction, etc. through an electrolytic solution, etc. In this case, an electric potential difference (voltage) occurs between the base 61 and the battery group 32 (the exterior container 3 of the battery 1), or an electric potential difference (voltage) occurs between the metal plate 55 and the battery group 32 (the exterior container 3 of the battery 1). However, in the present embodiment, the insulating sheets 56 and the insulating film 57 are arranged between the metal plate 55 and the battery group 32. Further, in each of the regions 48, the case bottom wall 42 protrudes from the case peripheral wall 43 and the partition wall 47 toward the inner peripheral side, and the case bottom wall 42 protrudes toward the inner peripheral side with respect to the insulating film 57. As a result, a creepage distance between the metal plate 55 and the battery group 32 is secured to a certain extent. Thus, an insulation distance (creepage distance) between the metal plate 55 and the battery group 32 is the above-described allowable limit value or more. In addition, a creepage distance between the base 61 and the battery group 32 is also secured to a certain extent by the insulating layer 62, the case 33, etc. Thus, an insulation distance (creepage distance) between the base 61 and the battery group 32 is the above-described allowable limit value or more.

As shown in FIG. 2, etc., in the battery module 31, the metal plate 55 is coupled to the case bottom wall 42 of the case 33 by four coupling screws (first coupling members) 71. In the battery system 30, the base 61 is coupled to the case bottom wall 42 of the case 33 by four coupling screws (second coupling members) 72. Each of the coupling screws 72 is located in the vicinity of a corresponding one of the coupling screws 71. In the present embodiment, each of the coupling screws 71 and 72 has conductivity and is formed of, for example, a metal. Each of the coupling screws 71 and 72 is provided on an outer side of the housing space 35, and is arranged on a side opposite to the side where the housing space 35 is located with respect to the case peripheral wall 43.

In addition, in the battery system 30, an electrical connection path 65 that electrically connects the metal plate 55 and the base 61 that are separated from each other is formed. In the present embodiment, a coupling screw 71A, which is one of the coupling screws 71, forms a part of the electrical connection path 65. In the present embodiment, a coupling screw 72A, which is one of the coupling screws 72 located in the vicinity of the coupling screw 71A, forms a different part of the electrical connection path 65 from the coupling screw 71A. The electrical connection path 65 is formed on the outer side of the housing space 35, and is formed on the side opposite to the side where the housing space 35 is located with respect to the case peripheral wall 43.

Figure 8:
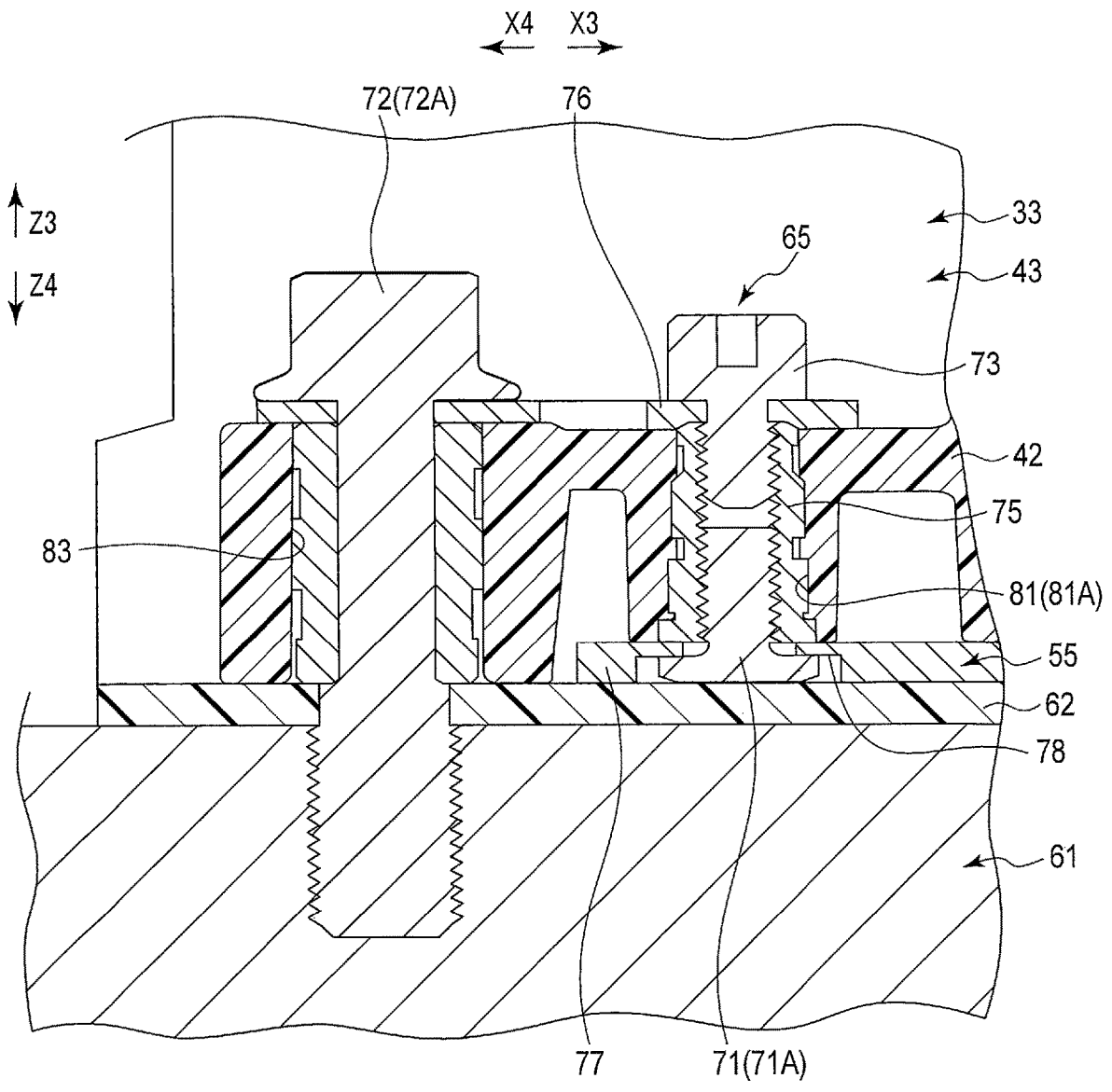
FIG. 8 is a cross-sectional view schematically showing a configuration of an electrical connection path and the vicinity thereof in the battery system according to the first embodiment.

FIG. 8 shows a configuration of the electrical connection path 65 and its vicinity. Although FIG. 8 shows an attachment structure of the coupling screw 71A to the metal plate 55 and the case bottom wall 42, an attachment structure of the coupling screw 71 other than the coupling screw 71A to the metal plate 55 and the case bottom wall 42 is the same as that of the coupling screw 71A. In addition, although FIG. 8 shows an attachment structure of the coupling screw 72A to the base 61 and the case bottom wall 42, an attachment structure of the coupling screw 72 other than the coupling screw 72A to the base 61 and the case bottom wall 42 is the same as that of the coupling screw 71A.

As shown in FIGS. 2 and 5, etc., the metal plate 55 is provided with four protruding pieces 77 that protrude toward an outer side with respect to the case peripheral wall 43 of the case 33. As shown in FIG. 8, etc., four holes 81 are formed in the case bottom wall 42 along the height direction of the battery module 31. Each of the holes 81 is arranged without shifting from a corresponding one of the protruding pieces 77 in the depth direction and the lateral direction of the battery module 31. Thus, each of the holes 81 overlaps a corresponding one of the protruding pieces 77. Each of the coupling screws 71 passes through a corresponding one of the protruding pieces 77 and is inserted into a corresponding one of the holes 81. A metal cylinder 75 is arranged in each of the holes 81. In each of the holes 81, an insertion portion of the coupling screw 71 is engaged with the metal cylinder 75 by, for example, screwing of a male screw and a female screw, and abuts the metal cylinder 75.

A head portion of a corresponding one of the coupling screws 71 abuts each of the protruding pieces 77 from a side where the base 61 is located in the height direction of the battery module 31. In addition, a concave portion 78 is formed on a surface facing the side where the base 61 is located in each of the protruding pieces 77. In each of the protruding pieces 77, the concave portion 78 is recessed toward the side where the battery group 32 is located (the side opposite to the side where the base 61 is located) in the height direction of the battery module 31. In each of the protruding pieces 77, a head portion of a corresponding one of the coupling screws 71 is arranged in the concave portion 78. Thus, the head portion of each of the coupling screws 71 does not protrude toward the side where the base 61 is located with respect to a portion other than the concave portion 78 of the metal plate 55.

Four through holes 83 passing through the case bottom wall 42 in the height direction of the battery module 31 are formed in the case bottom wall 42. Each of the through holes 83 is formed in the vicinity of a corresponding one of the holes 81. Each of the coupling screws 72 is inserted through a corresponding one of the through holes 83. Each of the coupling screws 72 passes through the insulating layer 62, and is inserted in an inner portion of the base 61. Each of the coupling screws 72 is engaged with the base 61 by, for example, screwing of a male screw and a female screw. A head portion of each of the coupling screws 72 is arranged on a side opposite to the side where the base 61 is located with respect to the case bottom wall 42 and the through hole 83.

In the present embodiment, in the electrical connection path 65, the coupling screws 71A and 72A are electrically connected to each other via the metal cylinder 75, a coupling screw 73, and a relay plate 76. The relay plate 76 is attached to the case bottom wall 42 of the case 33 via the coupling screw 73. Each of the relay plate 76 and the coupling screw 73 has conductivity and is formed of, for example, a metal. The relay plate 76 abuts the case bottom wall 42 from the side opposite to the side where the base 61 is located in the height direction of the battery module 31.

The relay plate 76 is sandwiched between the head portion of the coupling screw 72A and the case bottom wall 42, and is sandwiched between a head portion of the coupling screw 73 and the case bottom wall 42. The coupling screw 73 passes through the relay plate 76. The coupling screw 73 is inserted into a hole 81A, which is one of the holes 81 and into which the coupling screw 71A is inserted. The hole 81A is a through hole passing through the case bottom wall 42 in the height direction of the battery module 31. In the hole 81A, an insertion portion of the coupling screw 73 is engaged with the metal cylinder 75 by, for example, screwing of a male screw and a female screw, and abuts the metal cylinder 75. The holes 81 other than the hole 81A do not pass through the case bottom wall 42.

With the above-described configuration, the metal plate 55 is electrically connected to the base 61 via the coupling screw 71A, the metal cylinder 75, the coupling screw 73, the relay plate 76, and the coupling screw 72 in this order. That is, the electrical connection path 65 is formed from the metal plate 55 to the base 61 through the coupling screw 71A, the metal cylinder 75, the coupling screw 73, the relay plate 76, and the coupling screw 72 in this order.

In the present embodiment, the metal plate 55 and the base 61 are electrically connected by the electrical connection path 65. For example, in the example of FIG. 7, since the metal plate 55 is electrically connected to the base 61, the metal plate 55 is also grounded, and the metal plate 55 also becomes GND. By forming the electrical connection path 65, even if the metal plate 55 is provided in the battery module 31, charging in the metal plate 55 is effectively prevented, and generation of an electric potential difference (voltage) between the metal plate 55 and the base 61 is effectively prevented. Thus, discharging between the base 61 and the metal plate 55 is effectively prevented. Therefore, in the configuration in which the metal plate 55 that dissipates heat transmitted from the battery group 32 to the outer portion is provided, charging of the metal plate 55 and discharging from the metal plate 55 are effectively prevented.

In a case where the electrical connection path 65 is not provided, the exterior container 3 of each of the batteries 1 has an electric potential different from the GND (base 61) during charging and discharging of the battery group 32, and thus an electric potential difference (voltage) is generated between the exterior container 3 of each of the batteries 1 and the metal plate 55. Accordingly, the metal plate 55 is charged, and an electric potential difference (voltage) is generated between the base 61 and the metal plate 55. Further, the insulating layer 62 between the base 61 and the metal plate 55 is thin, and the clearance between the base 61 and the metal plate 55 is small. For this reason, when an electric potential difference is generated between the base 61 and the metal plate 55, an insulation distance between the metal plate 55 and the base 61 may be smaller than the allowable limit value defined in IEC62497-1 when the space between the base 61 and the metal plate 55 is viewed in a creepage plane passing through an inner surface of the case 33. In addition, the insulating layer 62 may be partially thinned due to unevenness of the surface of each of the base 61 and the metal plate 55, inclusion of an air layer (void) in the insulating layer 62, etc., which occur in manufacturing. In this case, a voltage exceeding a withstand voltage for dielectric breakdown is applied to the partially thinned portion of the insulating layer 62, and discharging from the metal plate 55 to the base 61 may occur. In the present embodiment, an electric potential difference (voltage) is not generated between the base 61 and the metal plate 55 due to the electrical connection path 65. Thus, even if the insulating layer 62 between the base 61 and the metal plate 55 is thin, the occurrence of discharging between the metal plate 55 and the base 61 is effectively prevented.

When the battery system 30, etc. is used for a railroad, for example, a large number of batteries are connected in series. In this case, depending on the battery module, an electric potential difference between the battery group 32 and the GND increases. Here, while an insulation distance between the battery group 32 and the metal plate 55 is sufficiently maintained, it is difficult to also sufficiently secure an insulation distance between the metal plate 55 and the base 61. Thus, in the present embodiment, the configuration not generating an electric potential difference between the metal plate 55 and the base 61 is realized by providing the electrical connection path 65 between the metal plate 55 and the base 61.

The insulating sheets 56 and the insulating film 57 are arranged between the metal plate 55 and the battery group 32. Further, in each of the regions 48, the case bottom wall 42 protrudes from the case peripheral wall 43 and the partition wall 47 toward the inner peripheral side, and the case bottom wall 42 protrudes toward the inner peripheral side with respect to the insulating film 57. As a result, when the battery group 32 is charged or discharged, etc., an insulation distance (creepage distance) between the metal plate 55 and the battery group 32 is an allowable limit value defined in IEC62497-1 or more. Thus, discharging between the metal plate 55 and the battery group 32 is also effectively prevented. The base 61 and the battery group 32 are electrically insulated from each other by the insulating layer 62, the case 33, etc. When the battery group 32 is charged or discharged, etc., an insulation distance (creepage distance) between the base 61 and the battery group 32 becomes an allowable limit value defined in IEC62497-1 or more. Thus, discharging between the base 61 and the battery group 32 is also effectively prevented.

Further, in the present embodiment, the metal plate 55 is provided between the battery group 32 and the base 61, and heat is dissipated from the metal plate 55 to the base 61. Since the heat is dissipated from the battery module 31 through the metal plate 55 having a high thermal conductivity, heat transference from the battery group 32 to the base 61, that is, heat dissipation from the battery module 31 to the base 61, is improved.

In the present embodiment, the insulating sheets 56 having plasticity are interposed between the battery group 32 and the metal plate 55. Each of the insulating sheets 56 closely contacts the battery group 32 and the metal plate 55 (insulating film 57). Further, the insulating sheets 56 have a higher thermal conductivity than that of the air and the case 33. Thus, the heat transference from the battery group 32 to the metal plate 55 is improved. Further, in the present embodiment, the insulating layer 62 having plasticity is interposed between the base 61 and the metal plate 55. The insulating layer 62 closely contacts the base 61 and the metal plate 55. Further, the insulating layer 62 has a higher thermal conductivity than that of the air and the case 33. Thus, heat transference from the metal plate 55 to the base 61 is improved.

Further, in the present embodiment, the electrical connection path 65 is formed on the outer side of the housing space 35, and is formed on the side opposite to the side where the housing space 35 is located with respect to the case peripheral wall 43. Thus, the battery group 32 in the housing space 35 is electrically insulated from the electrical connection path 65 by the case peripheral wall 43. For this reason, an insulation distance (creepage distance) between the battery group 32 and the electrical connection path 65 is appropriately secured in charging and discharging of the battery group 32, and discharging between the electrical connection path 65 and the battery group 32 is also effectively prevented.

In the present embodiment, one (71A) of the coupling screws 71 coupling the metal plate 55 to the case 33 forms a part of the electrical connection path 65, and one (72A) of the coupling screws 72 coupling the base 61 to the case 33 forms a part of the electrical connection path 65. Thus, even if the electrical connection path 65 is formed, the number of components to be added can be reduced. Further, in the present embodiment, by engaging the coupling screw 72A with the base 61, the metal plate 55 is electrically connected to the base 61, and the metal plate 55 is grounded. Thus, in grounding the metal plate 55, it is not necessary to use an additional component other than the coupling screw 72 used for installation of the battery module 31 on the base 61. This allows a worker, etc. to confirm whether or not the metal plate 55 is electrically connected to the base 61 by visually observing from the side (upper side) opposite to the base 61. Therefore, it is difficult for the worker, etc. to forget a task of electrically connecting the metal plate 55 to the base 61, that is, a task of grounding the metal plate 55.

(Modifications)

Note that the configuration of the electrical connection path 65 is not limited to the configuration of the above-described embodiment, etc. In a modification shown in FIG. 9, as in the above-described embodiment, the coupling screw 71A, which is one of the coupling screws 71, forms a part of the electrical connection path 65, and the metal cylinder 75 and the coupling screw 73 form a part of the electrical connection path 65. However, in the present modification, the relay plate 76 is not provided, and a coupling screw 72 provided in the vicinity of the coupling screw 71A is not included in the electrical connection path 65. In the present modification, an electric wiring 85 such as a conductive wire is provided. One end of the electric wiring 85 is connected to the coupling screw 73, and the other end of the electric wiring 85 is connected to the base 61. Thus, the coupling screw 73 is electrically connected to the base 61 via the electric wiring 85.

With the above-described configuration, the metal plate 55 is electrically connected to the base 61 via the coupling screw 71A, the metal cylinder 75, the coupling screw 73, and the electric wiring 85 in this order. That is, the electrical connection path 65 is formed from the metal plate 55 to the base 61 through the coupling screw 71A, the metal cylinder 75, the coupling screw 73, and the electric wiring 85 in this order. Also in the present modification, since the electrical connection path 65 is formed, discharging between the base 61 and the metal plate 55 is effectively prevented, and discharging from the metal plate 55 is effectively prevented, in the same manner as in the above-described embodiment, etc.

In one modification, a nut may be provided instead of the coupling screw 73 and the metal cylinder 75. In this case, the coupling screw 71A passes through the hole 81A, and the nut is engaged with the coupling screw 71A by, for example, screwing of a male screw and a female screw. Further, the nut abuts the relay plate 76 from the side opposite to the side where the base 61 is located. In the present modification, the electrical connection path 65 is formed from the metal plate 55 to the base 61 through the coupling screw 71A, the nut, the relay plate 76, and the coupling screw 72A in this order. Also in the present modification, since the electrical connection path 65 is formed, discharging between the base 61 and the metal plate 55 is effectively prevented, and discharging from the metal plate 55 is effectively prevented, in the same manner as in the above-described embodiment, etc.

In addition, in one modification, the base 61 contacts the metal plate 55 by an elastic force of a spring (not shown), etc. in a part of the clearance between the base 61 and the metal plate 55. As a result, an electrical connection path (65) that electrically connects the metal plate 55 and the base 61 is formed in the contact portion of the base 61 and the metal plate 55. Also in the present modification, since the electrical connection path 65 is formed, discharging between the base 61 and the metal plate 55 is effectively prevented, and discharging from the metal plate 55 is effectively prevented, in the same manner as in the above-described embodiment, etc.

In one modification, a sheet having plasticity and conductivity is arranged in the clearance between the base 61 and the metal plate 55. The sheet arranged in the clearance contacts the metal plate 55 and the base 61. The sheet is, for example, a rubber sheet in which silver is kneaded. In the present modification, the electrical connection path 65 is formed from the metal plate 55 to the base 61 through the above-described sheet. Also in the present modification, since the electrical connection path 65 is formed, discharging between the base 61 and the metal plate 55 is effectively prevented, and discharging from the metal plate 55 is effectively prevented, in the same manner as in the above-described embodiment, etc.

In addition, in the above-described embodiment, etc., one electrical connection path 65 is formed in the battery module 31, but a plurality of electrical connection paths similar to any one of the configurations described above may be provided in the battery module 31.

In addition, the number of batteries 1 forming the battery group 32, the arrangement of the plurality of batteries 1 in the battery group 32, etc. are not limited to those in the above-described embodiment, etc. It suffices that the battery group 32 includes a plurality of batteries.

According to at least one of these embodiments or examples, a metal plate is provided between a battery group and a metallic base and has a clearance between the base and itself. An insulator has plasticity and an electrical insulating property, and is sandwiched between the battery group and the metal plate. The metal plate is then electrically connected to the base by an electrical connection path. Thereby, it is possible to provide a battery module in which charging of the metal plate and discharging from the metal plate are effectively prevented in a configuration in which the metal plate that dissipates heat transmitted from the battery group to an outer portion is provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery module installed on a base made of a metal, the battery module comprising:

a battery group including a plurality of batteries, each of the batteries including an electrode group and an exterior container made of a metal in which the electrode group is housed;

a case including a case peripheral wall which surrounds a housing space of the battery group and having an electrical insulating property;

a metal plate provided between the battery group and the base and forming a clearance between the metal plate and the base;

an insulator having plasticity and an electrical insulating property, sandwiched between the battery group and the metal plate, and configured to electrically insulate between the exterior container of each of the batteries and the metal plate; and an electrical connection path configured to electrically connect the metal plate to the base, wherein the metal plate has (i) an upper surface facing a side of the battery module where the battery group is located, and (ii) a bottom surface facing a side of the battery module where the base is located, the metal plate includes a plurality of holes that each receive a coupling member, and the metal plate is continuously solid except for the plurality of holes, only a first insulating portion having an electrical insulating property is disposed between the upper surface of the metal plate and the battery group, the insulation portion including the insulator, and only a second insulating portion having an electrical insulating property is disposed between the bottom surface of the metal plate and the base, the second insulating portion including an insulating layer, and each of the coupling members in the holes are part of the electrical connection path without any generation of an electric potential difference between the metal plate and the base.

2. The battery module according to claim 1, wherein the insulator transmits, to the metal plate, heat transmitted from the battery group, and the insulator has a higher thermal conductivity than air and the case.

3. The battery module according to claim 1, wherein an electrical insulation distance between the metal plate and the battery group is an allowable limit value of an insulation distance, wherein a voltage between the metal plate and the battery group is 6 kV or less, and a creepage distance between the metal plate and the battery group is 12 mm or more.

4. The battery module according to claim 1, wherein the electrical connection path is formed on an outer side of the housing space of the battery group, and is formed on a side opposite to a side where the housing space is located with respect to the case peripheral wall.

5. The battery module according to claim 1, further comprising:

a first coupling member made of a metal, and configured to couple the case and the metal plate and form a part of the electrical connection path; and a second coupling member made of a metal, and configured to couple the case and the base and form a different part of the electrical connection path from the first coupling member.

6. The battery module according to claim 5, further comprising:

a relay plate made of a metal and attached to the case; and a third coupling member made of a metal and configured to couple the relay plate and the case, wherein the relay plate and the third coupling member are configured to electrically connect the first coupling member and the second coupling member in the electrical connection path.

7. The battery module according to claim 1, wherein the case includes a case bottom wall configured to support the battery group from a side where the metal plate is located, the metal plate being attached to the case bottom wall from a side opposite to a side where the battery group is located, the case bottom wall protrudes from the case peripheral wall toward an inner peripheral side, a through hole, through which the housing space of the battery group opens to an outer portion of the case, is formed in the case bottom wall, and a protruding end of the case bottom wall from the case peripheral wall forms at least a part of an edge of the through hole, and the insulator is arranged in the through hole.

8. A battery system comprising:

the battery module according to claim 1; and the base made of a metal on which the battery module is installed in a state where the metal plate is located between the base and the battery group.

9. The battery system according to claim 8, wherein the insulating layer of the second insulating portion transmits, to the base, heat transmitted from the metal plate, and the insulating layer has a higher thermal conductivity than air and the case.

10. The battery system according to claim 8, wherein an electrical insulation distance between the base and the battery group is an allowable limit of an insulation distance, wherein a voltage between the metal plate and the battery group is 6 kV or less, and a creepage distance between the metal plate and the battery group is 12 mm or more.

11. The battery system according to claim 8, wherein the base is GND.

\*   \*   \*   \*   \*